Dec. 20, 1960  F. RAVAZZI  2,965,470
METHOD FOR MANUFACTURING PHOSPHO-NITROGENOUS FERTILIZERS
Filed Feb. 5, 1957
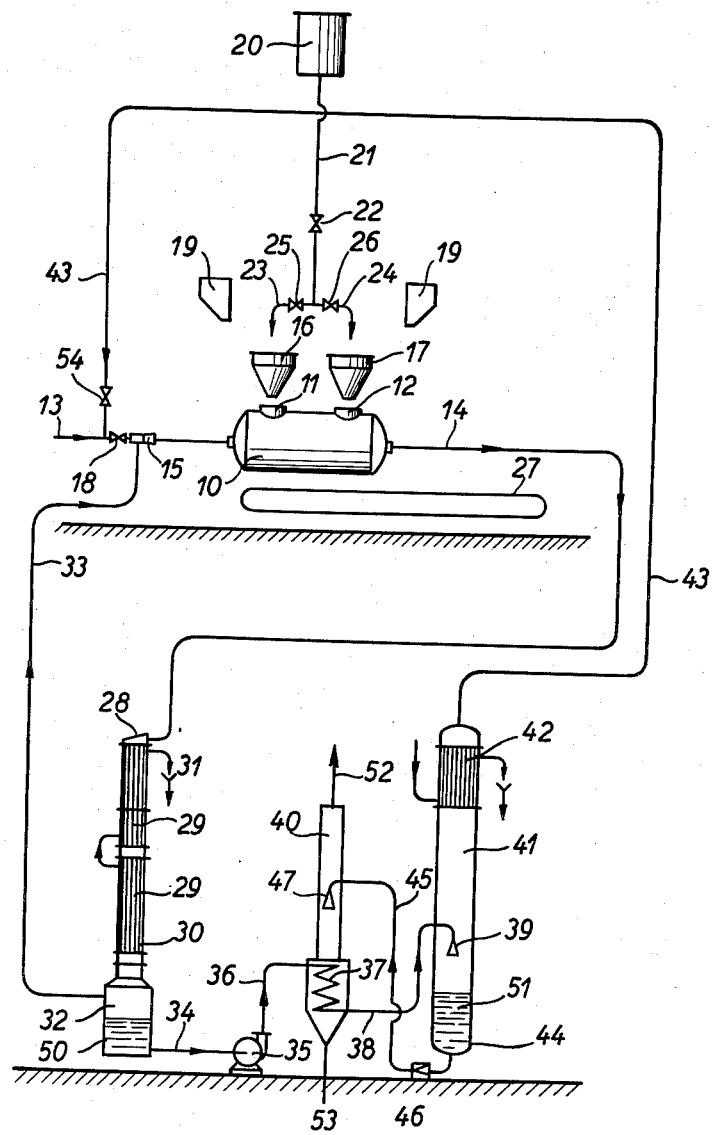
INVENTOR
FERDINANDO RAVAZZI
BY
ATTORNEY

United States Patent Office 2,965,470
Patented Dec. 20, 1960

2,965,470

METHOD FOR MANUFACTURING PHOSPHO-NITROGENOUS FERTILIZERS

Ferdinando Ravazzi, Turin, Italy, assignor to Rumianca S.p.A., Turin, Italy

Filed Feb. 5, 1957, Ser. No. 638,248

9 Claims. (Cl. 71—40)

This invention relates to improvements in the manufacture of phospho-nitrogenous fertilizers in a granulated dry condition by a method and by means of an equipment disclosed by Canadian Patent No. 516,812 granted to Rumianca Società per Azioni.

The equipment according to the abovementioned patent chiefly comprises two mixing chambers, a rotary drum forming a reaction chamber connecting at one end with a source of gaseous ammonia under pressure, and at its other end with an apparatus adapted to condense ammonia containing steam and, in addition thereto an evaporator adapted to separate gaseous ammonia from ammoniacal water and means for conveying said gaseous ammonia to said reaction chamber.

The abovementioned method consists in forming a slurry of ground phosphorite and diluted sulphuric acid, in which slurry sulphuric acid ($H_2SO_4$), water ($H_2O$) and phosphorite are in proportions such that the slurry is thick and contains excess sulphuric acid over the stoichiometric quantity required for converting the phosphorite to monocalcium phosphate, introducing the said slurry into the reaction chamber and supplying to the reaction chamber gaseous ammonia at superatmospheric pressure, thereby effecting an exothermic reaction through which the water contained in the slurry is evolved as steam which is condensed externally on the drum serving as a reaction chamber, rotation of the drum gradually converting the slurry to a substantially anhydrous granulated mass, thereby directly obtaining a phospho-nitrogenous fertilizer in a dry granulated condition directly ready for use and capable of being stored.

The main drawback of this prior method consists in the difficulty of rapidly and simultaneously forming a large quantity of initial granules from the slurry, more particularly in the very frequent case in which, in order to ultimately obtain a complex fertiliser having a prevailing nitrogen content over phosphorus, as generally required in agriculture, a large excess of sulphuric acid must be employed over the stoichiometrically required quantity for converting the phosphorite to monocalcium phosphate. By reason of the small total free surface exhibited by the slurry in the drum, the reaction with ammonia proceeds rather slowly, thereby occupying the reaction chamber at length and limiting the productive capacity of the equipment.

Various attempts have been made to obviate this drawback, including increase in ammonia pressure in the drum in order to accelerate gas absorption by the mass without, however, any appreciable success.

A further drawback of the method mentioned above resides in the necessity of employing apparatus and power quantities of appreciable value for recovering and re-cycling any ammonia not having reacted in the drum, since, as is well known, conveying and compressing hot moist ammoniacal vapors containing various gaseous impurities requires apparatus of special construction subject to wear and high maintenance cost.

This invention is firstly intended to eliminate the above mentioned drawbacks. A further object of this invention is to improve the quality of the granules of the resulting fertilizer so as to increase its commercial value.

According to this invention the method of manufacturing phospho-nitrogenous fertilizers in a dry granulated condition through reaction of gaseous ammonia at superatmospheric pressure in a rotary drum with an aqueous slurry consisting of the reaction product of phosphatic rawstuff with excess sulphuric acid over the stoichiometric quantity required for converting the phosphorite to monocalcium phosphate, is chiefly characterized by the fact that the addition of the total quantity of the required sulphuric acid is effected in two steps, more particularly, firstly in a proportion such that the acidity of said reaction product corresponds to a content of about 4.5–5.5% (preferably 5%) of free phosphoric acid ($H_3PO_4$) with a moisture content at the utmost of 10%, secondly in a quantity sufficient to evaporate the water in the slurry by means of the heat evolved in the successive reaction with the gaseous ammonia.

Further important characteristic features of this invention concern, as will be understood hereafter, recycling of ammonia and improvement of the standard of the granulated fertilizer obtained.

Broadly, the method according to this invention can be summarized as follows:

The phosphatic material can initially preferably consist of phosphorite or, if desired, either common or multiple superphosphate prepared by the ordinary known methods.

Where phosphorite is used, which is assumed to be in a ground condition, this is mixed with a sufficient quantity of sulphuric acid for converting the phosphorite to monocalcium phosphate and conferring at the same time to the resulting product a degree of acidity corresponding to a content of about 4.5–5.5% (preferably 5%) free $H_3PO_4$.

The concentration of the sulphuric acid employed should be such that said product is in the form of a paste having a moisture content not exceeding 10%.

Mixing can be effected in special mixing chambers or in the rotary drum itself, in which the process is subsequently carried out.

After the paste formed or introduced into the drum has acquired the above recited properties, it is admixed with further sulphuric acid. The quantity and concentration of the sulphuric acid to be added at this stage should be selected considering their decisive importance in respect of substantial water evaporation from the reaction mass in the drum, inasmuch as the subsequent flow of ammonia to the drum is not quantitatively adjusted, but is merely calculated to maintain the drum during the full period of reaction and granulation at a given pressure.

The quantity and concentration of the admixed sulphuric acid are selected so that upon saturation of the free acid by ammonia, by effect of the reaction heat substantially all the water has evaporated from the mass.

Upon this further addition of sulphuric acid a thick slurry results in the rotary drum and gradually heats up. The drum is connected in a manner known per se at one end to a source of compressed gaseous ammonia, at its other end to a condenser operating at a pressure in the reaction drum. The ammonia introduced into the drum reacts, the reaction heat causing the water in the slurry to evaporate, the resulting moist steam flowing to the condenser.

At the same time the slurry in the drum, which is steadily rotated in a manner known per se in this technique, gradually thickens and granulates. Starting from this point a considerable increase in evaporation can be ascertained, which is explained by the fact the incipient granulation has considerably enlarged the area of the slurry in contact with ammonia, so that penetration of the slurry by ammonia is accelerated and completed within a short period of time.

Generally, in processes of this kind an overheating of the reaction mass is to be feared. In carrying out this method it has been ascertained that, by operating substantially as described above, the risk of overheating is minimized and can be fully ignored. In fact, the steady flow of gaseous ammonia on the one hand and steady withdrawal of steam on the other hand are per se a control of temperature fully sufficient to avoid overheating of the mass throughout.

On the other hand, local overheating does not occur at all, inasmuch as incipient granulation of the slurry occurs so homogeneously throughout the mass, that actually no incrustation or local thickening deprived of the necessary heat exchange conditions with the surrounding material result.

When a common or multiple superphosphate prepared in any known manner, is used as a phosphatic rawstuff, the addition of sulphuric acid is likewise effected in two steps. By a first addition of suitably concentrated acid, both the acidity and moisture of the rawstuff are adjusted to obtain a paste having more than 10% moisture and about 5% free acidity expressed in weight as $H_3PO_4$.

The subsequent addition of sulphuric acid is effected along the lines set out above.

It will be clear from the above that according to this invention preparation of the paste to be subsequently converted to a slurry for reaction with ammonia is of decisive importance, whether the process starts from phosphorite or superphosphate.

The influence of the conditions of the paste on the whole granulating process could not be explained heretofore; it might merely be assumed that, while in the prior process the starting data for effecting granulation were derived from stoichiometric and thermo-chemical calculations, possibly subsequently corrected in accordance with experimental results, in the instant case the preparation of the paste actually leads to a valuable material starting from which errors liable to detrimentally affect the economical value of the present method or the standard of the resulting product can hardly be incurred.

It was further found that the resulting fertilizer granules are surprisingly tough and hard if, before effecting granulation, said paste is admixed with neutral saline substances adapted to react by a double exchange with the salts formed upon disintegration of the phosphorites by the inorganic acid. One of said substances which is highly suitable and even advantageous, inasmuch as it is at the same time an effective fertilizer, is potassium sulphate.

Potassium sulphate is included in the composition of mixed fertilizers generally as a fertilizer substance. It is not known to have been introduced into complex fertilizers prepared through chemical reactions for the well-defined purpose of improving consistency of the granules, nor to yield in ordinary preparations the effect surprisingly ascertained in the specific case.

The X-ray analysis of the product (diagrams of Debye and Scherrer) showed that actually double exchange reactions occur between potassium sulphate and phosphates in the slurry and form a potassium phosphate. Therefore, the formation of complex salts is believed to yield the hardening effect on the granules of the product obtained by adding potassium sulphate to the reaction mass, said potassium sulphate acting as a binding and hardening agent.

At any rate, the granules prepared according to this invention have been ascertained to possess an improved mechanical strength.

Comparative compression tests have been carried out on the granulated fertilizer prepared by the addition of potassium sulphate to the reaction mass and without said addition, respectively.

As exemplified hereafter, it has been found that brittleness of the granulated material prepared without the addition of potassium sulphate is of the order of 70% higher over granules prepared by adding potassium sulphate.

Further characteristic features and advantages of this invention will be understood from the following description referring to the accompanying drawing, diagrammatically showing a plant for manufacturing granulated fertilizers in accordance with the improved method.

In the drawing a reaction drum 10 is shown, which is mounted for rotation about its horizontal longitudinal axis and is provided in its periphery with an inlet and outlet opening 11, 12, respectively. The rotation pivots for the drum 10 are axially bored for feeding during rotation of the drum to one end thereof gaseous ammonia through a supply pipe 13 and valve 18, and steadily withdrawing at its opposite end gas and vapours through a pipe 14. Pipe 13 is connected at one end with a suitable source, not shown, of compressed gaseous ammonia and opens at its other end into an ejector 15 feeding the drum 10.

Two mixers 16, 17 are arranged above the drum 10 and are associated with the openings 11, 12, respectively, each of said mixers being adapted to be fed from a hopper 19 with the predetermined quantity of solid rawstuff.

The hopper and mixers are shown as an example of the means for effecting the first mixing step, but can be replaced by any other suitable means.

A measuring receptacle 20 is arranged over the mixers 16, 17 for feeding the latter with sulphuric acid. For this purpose a tube 21 is branched from the measuring receptacle 20 and is equipped with a shut-off cock 22, said tube 21 being branched at 23, 24 at its lower end, the branch pipes 23, 24 being adapted to supply sulphuric acid to their respective mixers 16, 17 on opening of the cocks 25, 26 interposed in said branch pipes. The mixers are equipped with piping, not shown on the diagram, for removing fluorhydric vapors and gases evolving during mixture. The openings 11, 12 can be tightly closed by means of suitable covers provided with clamping means, whereby the drum 10 can be subjected to an internal pressure during the full reaction and granulation period, at the end of which the solid reaction product can be discharged through openings 11, 12 onto a band conveyor 27 for cooling, filling into bags or conveying to a store.

The pipe 14 opens into the top of a column condenser 28. This condenser is equipped at the top with bundles of vertically extending heat exchange tubes 29 fed at the bottom at 30 with cooling water which is discharged at 31 from the condenser top. The lower condenser portion comprises a condensate collecting receptacle 32. It will be clear that the condenser 28 operates in countercurrent in respect of gases and vapors fed thereto through pipe 14.

A pipe 33 extends from the top of the collector 32 and opens at its other end into the ejector 15. Consequently, as condensate (an aqueous ammoniacal solution) collects on the bottom of the collector 32, non-condensed gaseous ammonia is drawn through pipe 33 into the ejector 15 and reintroduced into the drum 10 by the action of the gaseous ammonia flow from pipe 3 through the ejector.

A pipe 34 extends from the bottom of the collector 32 and opens at its other end into the suction side of a liquid pump 35. The ammoniacal solution drawn from the collector 32 can therefore be pumped by pump 35 through a pipe 36, coil 37 and pipe 38 to a delivery nozzle 39. The coil 37 is associated with a flashing apparatus, the nozzle 39 being associated with an evaporator 41.

The evaporator 41 comprises a pressure-tight column, of which the bottom portion operates as a stripping boiler, its top enclosing a condenser 42. The nozzle 39 is arranged intermediate the column 41. A tube 43 extends from the top of the column 41 and opens at its other end into the pipe 13 directly past the ejector 15. Steam at superatmospheric pressure is fed to the base of the column 41 at 44, whence a tube 45 extends and has a pressure reducing valve 46 interposed therein. The tube 45 ends by a nozzle 47 arranged in the flashing apparatus 40 over the coil 37.

The plant generally operates as described hereafter.

Assuming the drum 10 is filled with the product resulting from disintegration of a phosphatic material by sulphuric acid, the drum is rotated, gaseous ammonia at superatmospheric pressure being supplied through pipe 13. As the neutralizing reaction proceeds, steam evolves in the drum 10 and is evacuated from the drum together with part of the ammonia through pipe 14 and admitted into the top of the condenser 28. A substantially full condensation of steam takes place in the condenser 28, an aqueous ammoniacal solution 50 collecting on the bottom of the collector 32, with gaseous ammonia overlying said solution. The gaseous ammonia is drawn through pipe 13 to the ejector 15, compressed and reintroduced into the drum 10, while the ammoniacal solution 50 is pumped by pump 35 to the evaporator 41 in which it is converted to a finely subdivided rain by the nozzle 39.

Part of the ammonia contained in this rain promptly separates, water 51 practically free from ammonia collecting on the bottom of the column 41, steam being blown therethrough through the connecting pipe 44. This sets up a stripping action by the steam so that, as the solution 51 is heated up, further gaseous ammonia separates and escapes upwardly towards the condenser 42. Steam carried along by the flow of ammonia is condensed in the condenser, purified ammonia flowing through pipe 43 to pipe 13 back to the drum 10. The aqueous residue on the bottom of the column 41 is expanded through the pressure reducing valve 46 and admitted through the tube 45 and nozzle 47 into the flashing apparatus 40. This apparatus operates at atmospheric pressure and effects a thorough evaporation of the solution sprayed by the nozzle 47, on the other hand heating the serpentine 37 through which the ammoniacal solution 50 is pumped to the evaporator 41. Consequently, said solution reaches the evaporator 41 at increased temperature, which furthers evaporation of any ammonia still contained in the rain sprayed by the nozzle 39. The last traces of ammonia are therefore recovered at 52 at the top of the flashing apparatus 40, relatively hot water being discharged from its bottom at 53.

Pressures in the various apparatus are as follows:

Evaporator 41: 12–20 kg./sq. cm. absolute pressure
Flashing apparatus 40: atmospheric pressure
Drum 10 and condenser 28: 1–4 kg./sq. cm. absolute pressure.
Pipe 43: 12–20 kg./sq. cm. absolute pressure, in any case a pressure substantially equalling the pressure in the evaporator 41; in order to insure an improved flexibility of the plant an adjusting valve is advantageously interposed in the pipe 43, whereby the pressures in pipe 13, drum 10 and condenser 28 are made further independent of the pressure in the evaporator 41.

Examples of the manner of carrying out the invention will now be described, reference being made where necessary to the method disclosed by the abovementioned Canadian Patent No. 516,812.

*Example 1*

Referring to the plant shown and described, 10,000 kgs. ground phosphorite containing 34–35% phosphoric anhydride are stirred to a homogeneous condition in mixers 16, 17 with 10,000 kgs. sulphuric acid containing 74.5% $H_2SO_4$. A paste is obtained containing about 5% free phosphoric acid ($H_3PO_4$) and about 9% moisture. This paste is introduced into the drum 10 through openings 11, 12 whereupon further 3,650 kgs. 74.5% sulphuric acid are added from the measuring receptacle 20. The openings 11, 12 are then closed pressure-tight, the drum is rotated and gaseous ammonia at a pressure (measured at 13) of 6 to 8 kgs./sq. cm. absolute pressure are introduced. As reaction proceeds, the temperature rises and the steam evolved flows together with gaseous ammonia through pipe 14 to the condenser 28. An aqueous ammoniacal solution 50 concentrated at 20–25% $NH_3$ at a temperature of 40° C. collects below the condenser in the collector 32, a flow of gaseous ammonia returning through pipe 33 to the ejector 15 and drum 10. The solution 50 is pumped by the pump 35 through the coil 37 to the evaporator 41 operating at an absolute pressure of 20 kgs./sq. cm. and receiving live steam at 44 at an absolute pressure of about 22 kgs./sq. cm. The solution 51 which contains but a slight quantity of ammonia is expanded through the valve 46 to atmospheric pressure and admitted to the flashing apparatus 40, a further flow of ammonia flowing through the pipe 43 to the adjusting valve 54, pipe 13 and drum 10. A steady flow of gaseous ammonia is thereby established through the ejector 15 at a pressure (measured at 13) of 6 to 8 kg./sq. cm. and is mostly absorbed in the drum, this absorbed portion being made up for through the pipe 13. It will be clear that circulation of gaseous ammonia is largely effected by the pump 35 and pressure conditions in the evaporator 41, the pump 35 operating on the ammoniacal solution 50, that is, under highly favorable conditions.

After 4 hours the neutralizing reaction and granulation in the drum 10 are completed. Suitable valves in the ammonia circuit are then closed, the drum is stopped, the openings 11, 12 in the drum are opened, the reaction product being discharged on the band conveyor 27. Incidentally, the pump 35 consumed 5 kw.-hr. electric power.

Properties of the product:

(a) Grain size:
15% of the grains, size 4–6 mm.
70% of the grains, size 1.5–4 mm.
15% of the grains, size 0.5–1.5 mm.

100%

(b) Moisture: below 2%
(c) Chemical analysis:

pH=3.7%
$P_2O_5$ soluble in water, ammonium citrate and citric acid, 13.4%
Ammonical nitrogen: 8.5%

(d) X-ray analysis: The spectrum denotes the presence of: $(NH_4)_2SO_4$, $NH_4H_2PO_4$, $Ca(H_2PO_4)_2$, $CaSO_4$ The granules ranging in size between 1.5 and 4 mm. were submitted to compression tests in order to determine their strength against mechanical crushing actions. Under a pressure of 20 kg./sq. cm. out of a mass of 100 grams granules, 1.5 grams as an average, that is, 1.5% by weight were crushed.

*Example 2*

10,000 kgs. ground phosphorite containing 34–35% phosphoric anhydride were stirred to homogeneousness with 14,150 kgs. 74.5% sulphuric acid, the resulting slurry was charged to a rotary drum for treatment by the method disclosed by Canadian Patent 516,812. The plant was of the type described and diagrammatically shown in Figure 2 in the above patent. The drum was connected at one end with a source of gaseous ammonia under an absolute pressure of 8 kg./sq. cm. and at its other end to a condenser. Ammonia was re-cycled to the drum by means of a compressor operating on ammonia containing vapors.

The reaction with ammonia and granulation were completed after a period of 6 hours 15 minutes from the moment the drum had been set in rotation and supply of ammonia had been started. During this period the power absorbed by the compressor was 70 kw.-hr. The chemical composition and grain size of the resulting product did not substantially differ from those of the product obtained according to Example 1. The steam consumption in this case was substantially the same as in Example 1.

Examples 1 and 2 summarize a larger number of comparative tests between the processes according to Canadian Patent 516,312 and this invention, respectively. The examples are typical of both processes and show that according to this invention the period of operation is reduced by about ⅓, the output of the plant being increased by about 50%.

The examples further show that consumption of electric power in Example 1 is much lower than in Example 2, more particularly by a ratio of about 1:14.

It should further be considered that the pump in Example 1 operates on an ammoniacal solution, while the compressor employed in Example 2 conveys moist impure ammoniacal vapors. The compressor necessitates a special construction, some components thereof being subject to considerable wear and damage, which disturbs reliability in operation and implies considerable maintenance cost.

Consequently, the process according to this invention is certainly less expensive under all aspects and is therefore a decisive improvement over prior art.

*Example 3*

In the plant shown on the drawing 6,000 kgs. ground phosphorite containing 34–35% phosphoric anhydride were stirred in mixers 16, 17 with 7,000 kgs. 74.5% sulphuric acid, charged into the drum 10 and stirred therein with 3,600 kgs. commercial potassium sulphate to homogeneousness.

A paste was obtained containing 5.5% free phosphoric acid and about 10% moisture. At this stage 3,600 kgs. 74.5% sulphuric acid were introduced into the drum 10, the openings 11, 12 were closed and the procedure disclosed in Example 1 followed.

After 3 hours 50 minutes the reaction was completed. The openings 11, 12 were opened and the product discharged on the belt conveyor 27.

Properties of the product:

(a) Grain size:
12% of the grains, size 4–6 mm.
72% of the grains, size 1.5–4 mm.
16% of the grains, size 0.5–1.5 mm.
100%

(b) Moisture: below 2%

(c) Chemical analysis:
pH=3.7
$P_2O_5$ soluble in water, ammonium citrate and citric acid, 12.3%
Ammoniacal nitrogen, 7.1%
$K_2O$=9%

(d) X-ray analysis: The spectrum denotes the presence of: $(NH_4)_2SO_4$, $NH_4H_2PO_4$, $K_2SO_4$, $Ca(H_2PO_4)_2$, $CaSO_4$, $KH_2PO_4$.

Similarly to the products according to the preceding examples, this product was subjected to compression tests in order to determine its strength against mechanical crushing action. It was ascertained that a pressure of 20 kgs./sq. cm. will crush as an average 0.8% of the mass of grains ranging in size between 1.5 and 4 mm.

The X-ray analysis confirms the assumption that under operational conditions of the process double exchange chemical reactions occur between potassium sulphate and phosphates in the reacting mass, forming complex salts or actual solid solutions in which the potassium sulphate acts as a binding hardening agent. This may explain the considerable improvement in cohesion of the individual granules of the product. Micrographic analysis on various specimens of the product upheld the above assumption.

Comparison of the compression strength of the product prepared in accordance with Examples 1 and 2 and of the product prepared in accordance with Example 3 discloses that brittleness of the former is of the order of 70% higher than brittleness of the latter.

Storage and transport tests carried out on the above described products mostly confirmed that on manipulations (filling into bags, transport of the bags on lorries, piling up in stores) the product prepared in accordance with Example 3 is of appreciably greater strength against mechanical actions, which is of considerable practical importance.

As mentioned above, the solid rawstuff need not be phosphorite, since it was ascertained that the method can even be carried out starting from an either common or multiple super-phosphate. The only difference resides in the fact that, where a superphosphate is treated, its free phosphoric acid and moisture contents should be preliminarily determined and said contents should be adjusted to about 5% and 10%, respectively, of acid and moisture, taking care that the resulting mass is as homoegneous as possible. This operation can be carried out in the mixers 16, 17 shown on the drawing, in which the superphosphate is fed from the hoppers 18, 19 and sulphuric acid is caused to flow down from the reservoir 20.

It will be clear that the value of this invention can be appreciated within the limits set out above and defined in the appended claims, that is, within the technique of preparing phosphatic fertilisers in which a thick slurry, to which some authors refer as "magma," comprising a product resulting from the disintegration of a phosphatic material by sulphuric acid, is neutralized in a rotatable drum with gaseous ammonia at superatmospheric pressure, all the water in the slurry being simultaneously eliminated from the drum without supplying heat.

What I claim is:

1. A method of producing phospho-nitrogenous anhydrous and granulated fertilizers from a material selected from the group consisting of phosphorite and superphosphate, which comprise the steps of admixing said material with aqueous sulphuric acid in a quantity such that a homogeneous acidic magma is obtained having an acidity which corresponds to a content of 4.5 to 5.5% of free $H_3PO_4$ and a moisture content of at most 10% by weight, thereupon confining the magma in a rotatable fluid-tight reaction zone, admixing the magma with a further quantity of aqueous sulphuric acid to obtain a thick slurry, continuously delivering gaseous ammonia into the slurry within the reaction zone while rotating said zone, thereby causing steam to be evolved from the slurry, establishing a unidirectional flow of the steam and unreacted ammonia from the reaction zone to a condensation zone, thereby obtaining an ammonia-containing condensate in said condensation zone, withdrawing the condensate from the condensation zone, recovering gaseous ammonia from the condensate, recirculating the recovered ammonia into the reaction zone, and withdrawing from said reaction zone a phospho-nitrogenous granulated fertilizer.

2. A method of producing a phospho-nitrogenous anhydrous and granulated fertilizer from a ground phosphorite which comprises the steps of admixing the phosphorite with sulphuric acid, thereby converting it to monocalcium phosphate, admixing the mono-calcium phosphate with aqueous sulphuric acid in a quantity such that a homogeneous acidic magma is obtained having an acidity which corresponds to a content of 4.5 to 5.5% of free $H_3PO_4$ and a moisture content of at most 10% by weight, thereupon confining the magma in a rotatable fluid-tight reaction zone, admixing the magma with a further quantity of aqueous sulphuric acid to obtain a thick slurry, continuously delivering gaseous ammonia into the slurry within the reaction zone while rotating said zone, thereby causing steam to be evolved from the slurry, establishing a unidirectional flow of the steam and unreacted ammonia from the reaction zone to a condensation zone, thereby obtaining an ammonia-containing condensate in said condensation zone, withdrawing the condensate from the condensation zone, recovering gaseous ammonia from the condensate, recirculating the recovered ammonia into the reaction zone, and withdrawing from said reaction zone a phospho-nitrogenous granulated fertilizer.

3. A method of producing a phospho-nitrogenous anhydrous and granulated fertilizer from a superphosphate which comprises the steps of admixing the superphospate with aqueous sulfuric acid in a quantity such that a homogeneous acidic magma is obtained having an acidity which corresponds to a content of 4.5 to 5.5% of free $H_3PO_4$ and a moisture content of at most 10% by weight, thereupon confining the magma in a rotatable fluid-tight reaction zone, admixing the magma with a further quantity of aqueous sulphuric acid to obtain a thick slurry, continuously delivering gaseous ammonia into the slurry within the reaction zone while rotating said zone, thereby causing steam to be evolved from the slurry, establishing a unidirectional flow of the steam and unreacted ammonia from the reaction zone to a condensation zone, thereby obtaining an ammonia-containing condensate in said condensation zone, withdrawing the condensate from the condensation zone, recovering gaseous ammonia from the condensate, recirculating the recovered ammonia into the reaction zone, and withdrawing from said reaction zone a phospho-nitrogenous granulated fertilizer.

4. A method of producing phospho-nitrogenous anhydrous and granulated fertilizer from a material selected from the group consisting of phosphorite and superphosphate, which comprises the steps of admixing said material with aqueous sulphuric acid in a quantity such that a homogeneous acidic magma is obtained having an acidity which corresponds to a content of 4.5 to 5.5% of free $H_3PO_4$ and a moisture content of at most 10% by weight, thereupon confining the magma in a rotatable fluid-tight reaction zone, admixing the magma with a further quantity of aqueous sulfuric acid to obtain a thick slurry, continuously delivering gaseous ammonia into the slurry within the reaction zone while rotating said zone, thereby causing steam to be evolved from the slurry, establishing a unidirectional flow of the steam and unreacted ammonia from the reaction zone to a condensation zone, thereby obtaining an ammonia-containing condensate in said condensation zone, pumping the condensate from the condensation zone to an evaporation zone, stripping ammonia from the condensate in the evaporation zone, recovering the stripped ammonia in a gaseous condition and re-cycling it to the reaction zone, and withdrawing from the reaction zone a phospho-nitrogenous granulated fertilizer.

5. A method of producing a phospho-nitrogenous anhydrous and granulated fertilizer from a material selected from the group consisting of phosphorite and superphosphate, which comprises the steps of admixing said material with aqueous sulphuric acid in a quantity such that a homogeneous acidic magma is contained having an acidity which corresponds to a content of 4.5 to 5.5% of free $H_3PO_4$ and a moisture content of at most 10% by weight, thereupon confining the magma in a rotatable fluid-tight reaction zone, admixing the magma with a further quantity of aqueous sulphuric acid to obtain a thick slurry, continuously delivering gaseous ammonia into the slurry within the reaction zone while rotating said zone, thereby causing steam to be evolved from the slurry, establishing a unidirectional flow of the steam and unreacted ammonia from the reaction zone to a condensation zone, thereby obtaining an ammonia-containing condensate in said condensation zone, pumping the condensate from the condensation zone towards an evaporation zone while heating said condensate on its path towards the evaporation zone, stripping ammonia from the condensate in the evaporation zone, recovering the stripped ammonia in a gaseous condition and re-cycling it to the reaction zone, withdrawing a condensate poor in ammonia from the evaporation zone, expanding it and causing it to heat the first named condensate on the said path towards the evaporation zone, and withdrawing from the reaction zone a phosphonitrogenous granulated fertilizer.

6. A method of producing a phospho-nitrogenous anhydrous and granulated fertilizer from a material selected from the group consisting of phosphorite and superphosphate as defined in claim 5, wherein the evaporation zone is at a super-atmospheric pressure higher than the pressure of the gaseous ammonia being delivered to the reaction zone.

7. A method as defined in claim 5, wherein the reaction zone is at an absolute pressure of one to four atmospheres, and the evaporation zone is at an absolute pressure of 12 to 20 atmospheres.

8. A method as defined in claim 1, further comprising the step of admixing the magma with an anhydrous neutral salt capable of reacting by double-exchange with the salt components of the magma formed by the action of said sulfuric acid upon said material prior to admixing the magma with said further quantity of sulphuric acid to obtain a thick slurry.

9. A method as defined in claim 1, further comprising the step of admixing the magma with an anhydrous potassium sulphate prior to admixing the magma with said further quantity of sulphuric acid to obtain a thick slurry.

References Cited in the file of this patent

UNITED STATES PATENTS

| 709,185 | Terne | Sept. 16, 1902 |
| 2,136,793 | Gabeler et al. | Nov. 15, 1938 |
| 2,504,545 | Waring et al. | Apr. 18, 1950 |

FOREIGN PATENTS

| 689,751 | Great Britain | Apr. 1, 1953 |
| 691,920 | Great Britain | May 27, 1953 |